United States Patent
Croak et al.

(10) Patent No.: US 7,881,289 B1
(45) Date of Patent: Feb. 1, 2011

(54) METHOD AND APPARATUS FOR PORTING TELEPHONE NUMBERS OF ENDPOINT DEVICES

(75) Inventors: Marian Croak, Fair Haven, NJ (US); Hossein Eslambolchi, Los Altos Hills, CA (US)

(73) Assignee: AT&T Intellectual Property II, L.P., Reno, NV (US)

( * ) Notice: Subject to any disclaimer, the term of this patent is extended or adjusted under 35 U.S.C. 154(b) by 1772 days.

(21) Appl. No.: 11/019,504

(22) Filed: Dec. 22, 2004

(51) Int. Cl.
*H04L 12/66* (2006.01)

(52) U.S. Cl. ............... 370/356; 370/331; 370/352; 370/401; 705/28; 705/51; 709/225; 709/228; 709/230; 709/250; 715/764; 719/328; 725/119

(58) Field of Classification Search ............ 370/254, 370/352, 384, 392, 331, 356, 395.53, 401; 705/28, 51; 709/227, 230, 250, 223, 229, 709/221, 225, 228; 455/561; 715/764; 725/119; 379/211.02; 714/4; 718/105; 719/328
See application file for complete search history.

(56) References Cited

U.S. PATENT DOCUMENTS

| | | | | |
|---|---|---|---|---|
| 6,049,825 A * | 4/2000 | Yamamoto | ............ | 709/221 |
| 6,393,484 B1 * | 5/2002 | Massarani | ............ | 709/227 |
| 6,512,774 B1 * | 1/2003 | Vepa et al. | ............ | 370/401 |
| 6,546,392 B1 * | 4/2003 | Bahlmann | ............ | 1/1 |
| 6,560,630 B1 * | 5/2003 | Vepa et al. | ............ | 718/105 |
| 6,678,265 B1 * | 1/2004 | Kung et al. | ............ | 370/352 |
| 6,753,887 B2 * | 6/2004 | Carolan et al. | ............ | 715/764 |
| 6,874,147 B1 * | 3/2005 | Diamant | ............ | 719/328 |
| 7,020,796 B1 * | 3/2006 | Ennis et al. | ............ | 714/4 |
| 7,046,659 B1 * | 5/2006 | Woundy | ............ | 370/352 |
| 7,058,022 B1 * | 6/2006 | Carolan et al. | ............ | 370/254 |
| 7,069,344 B2 * | 6/2006 | Carolan et al. | ............ | 709/250 |
| 7,243,080 B2 * | 7/2007 | Bhadra | ............ | 705/28 |
| 7,298,708 B2 * | 11/2007 | Nasiri et al. | ............ | 370/254 |
| 7,313,611 B1 * | 12/2007 | Jacobs et al. | ............ | 709/223 |
| 7,447,780 B2 * | 11/2008 | McMahon et al. | ............ | 709/227 |
| 7,480,274 B2 * | 1/2009 | Shitama et al. | ............ | 370/331 |
| 7,720,076 B2 * | 5/2010 | Dobbins et al. | ............ | 370/395.53 |
| 2001/0049737 A1 * | 12/2001 | Carolan et al. | ............ | 709/228 |
| 2002/0013844 A1 * | 1/2002 | Garrett et al. | ............ | 709/225 |
| 2002/0196776 A1 * | 12/2002 | Chiang | ............ | 370/352 |
| 2003/0060235 A1 * | 3/2003 | Yamato et al. | ............ | 455/561 |
| 2003/0105719 A1 * | 6/2003 | Berger et al. | ............ | 705/51 |
| 2003/0106067 A1 * | 6/2003 | Hoskins et al. | ............ | 725/119 |
| 2004/0105433 A1 * | 6/2004 | Seo | ............ | 370/352 |
| 2005/0021786 A1 * | 1/2005 | Kikkawa et al. | ............ | 709/229 |
| 2005/0259654 A1 * | 11/2005 | Faulk | ............ | 370/392 |
| 2006/0114894 A1 * | 6/2006 | Cherchali et al. | ............ | 370/389 |
| 2006/0126813 A1 * | 6/2006 | Foladare et al. | ............ | 379/211.02 |
| 2006/0168264 A1 * | 7/2006 | Baba et al. | ............ | 709/230 |
| 2006/0253852 A1 * | 11/2006 | Honda et al. | ............ | 717/177 |

* cited by examiner

*Primary Examiner* — Gerald Gauthier

(57) ABSTRACT

The present invention enables a capability for automatically porting the telephone number of the original VoIP endpoint device to the user's new VoIP endpoint device by re-associating the original telephone number with the MAC address of the new IP endpoint device.

20 Claims, 4 Drawing Sheets

METHOD AND APPARATUS FOR PORTING TELEPHONE NUMBERS OF ENDPOINT DEVICES

The present invention relates generally to communication networks and, more particularly, to a method and apparatus for porting telephone numbers of Internet Protocol (IP) endpoint devices in packet-switched networks, e.g., Voice over Internet Protocol (VoIP) networks.

BACKGROUND OF THE INVENTION

Users of network services will use a variety of endpoint devices to access these network services. Users will require changing these endpoint devices from time to time due to their desire for upgrades or to replace damaged or lost components.

Therefore, a need exists for a method and apparatus for porting telephone numbers of Internet Protocol (IP) endpoint devices in packet-switched networks, e.g., Voice over Internet Protocol (VoIP) networks.

SUMMARY OF THE INVENTION

In one embodiment, the present invention enables a capability for automatically porting the telephone number of the original VoIP endpoint device to the user's new VoIP endpoint device. In one embodiment, this porting is accomplished by re-associating the original telephone number with the MAC address of the new IP endpoint device.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
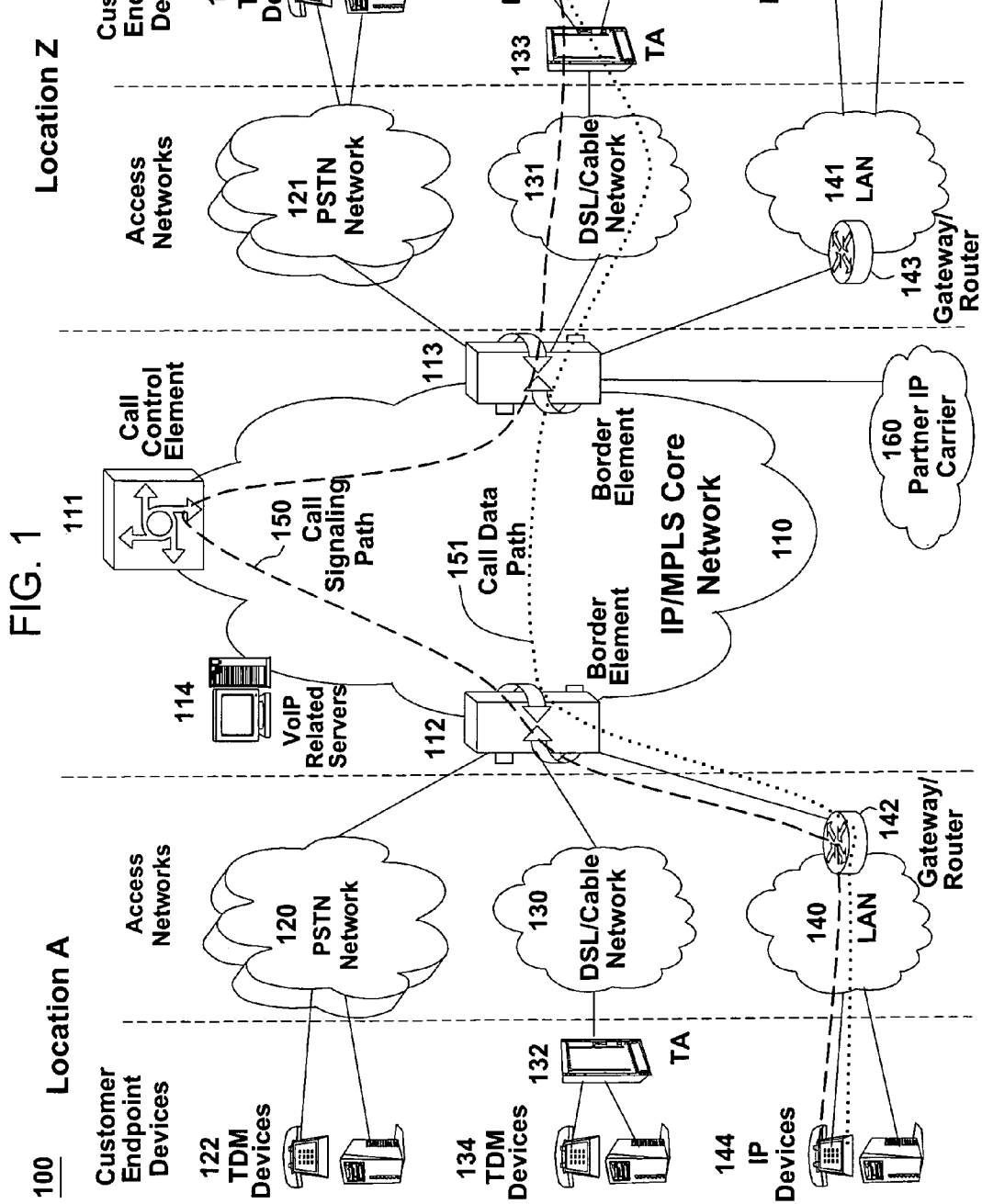
FIG. 1 illustrates an exemplary Voice over Internet Protocol (VoIP) network related to the present invention.

To better understand the present invention, FIG. 1 illustrates an example network, e.g., a packet-switched network such as a VoIP network related to the present invention. The VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. An IP network is broadly defined as a network that uses Internet Protocol to exchange data packets.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such the Border Element (BE) 112 and 113, the Call Control Element (CCE) 111, and VoIP related servers 114. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related servers in order to complete a call that require certain service specific features, e.g. translation of an E.164 voice network address into an IP address.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

In order to illustrate how the different components operate to support a VoIP call, the following call scenario is used to illustrate how a VoIP call is setup between two customer endpoints. A customer using IP device 144 at location A places a call to another customer at location Z using TDM device 135. During the call setup, a setup signaling message is sent from IP device 144, through the LAN 140, the VoIP Gateway/Router 142, and the associated packet based access network, to BE 112. BE 112 will then send a setup signaling message, such as a SIP-INVITE message if SIP is used, to CCE 111. CCE 111 looks at the called party information and queries the necessary VoIP service related server 114 to obtain the information to complete this call. If BE 113 needs to be involved in completing the call; CCE 111 sends another call setup message, such as a SIP-INVITE message if SIP is used, to BE 113. Upon receiving the call setup message, BE 113 forwards the call setup message, via broadband network 131, to TA 133. TA 133 then identifies the appropriate TDM device 135 and rings that device. Once the call is accepted at location Z by the called party, a call acknowledgement signaling message, such as a SIP-ACK message if SIP is used, is sent in the reverse direction back to the CCE 111. After the CCE 111 receives the call acknowledgement message, it will then send a call acknowledgement signaling message, such as a SIP-ACK message if SIP is used, toward the calling party. In addition, the CCE 111 also provides the necessary information of the call to both BE 112 and BE 113 so that the call data exchange can proceed directly between BE 112 and BE 113. The call signaling path 150 and the call data path 151 are illustratively shown in FIG. 1. Note that the call signaling path and the call data path are different because once a call has been setup up between two endpoints, the CCE 111 does not need to be in the data path for actual direct data exchange.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

Users of VoIP network services will use a variety of endpoint devices to access these network services. The endpoint devices used to access these services include Terminal Adaptors (TA) and IP phones. Users will require changing these endpoint devices from time to time due to their desire for upgrades or to replace damaged or lost components. When a change of IP endpoint device occurs, the new Media Access Control (MAC) address must be re-registered in the VoIP network to associate the new MAC address with the original phone number subscribed by the user. Broadly, a MAC address is a unique 48 bit hardware address of a device connected to a network. MAC addresses are globally controlled and assigned by the Institute of Electrical and Electronics Engineers (IEEE). A Terminal Adaptor is a device that connects an analog telephone device to a VoIP network.

To address this need, the present invention enables a capability for automatically porting the telephone number of the original VoIP endpoint device to the user's new VoIP endpoint device. In one embodiment, this porting is accomplished by re-associating the original telephone number with the MAC address of the new IP endpoint device.

Figure 2:
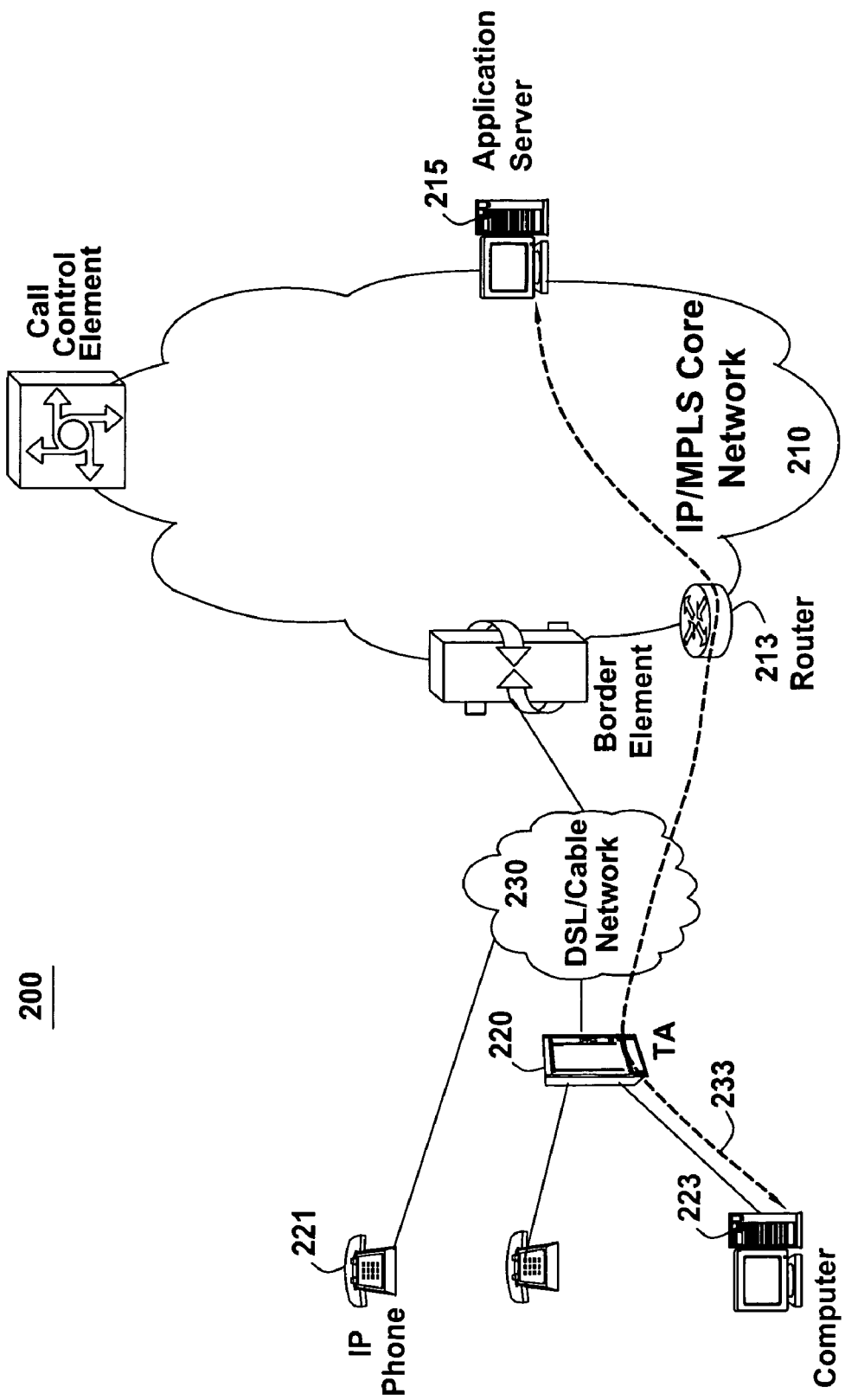
FIG. 2 illustrates an example of automatically porting telephone number of Internet Protocol (IP) endpoint device in a VoIP network of the present invention.

FIG. 2 illustrates an example of automatically porting telephone number of Internet Protocol (IP) endpoint device in a packet-switched network, e.g., a VoIP network 210. FIG. 2 shows that two new endpoint devices TA 220 and IP phone 221 have been changed for either upgrade or replacement reasons by a user. Both TA 220 and IP phone 221 have new MAC addresses that are not registered with or known to the VoIP network provider; therefore, registrations of the new MAC address information is needed. For TA 220, the user can use a computer, 223, connected to the TA to access a predefined website, using flow 233 via router 213, to perform the registration of the new device. The user needs to supply the phone number of the original account as well as the password to login to the Registration Server (AS) 215 via internet access. Once the login has been accepted by AS 215, the new MAC address information can be manually entered by the user to be registered via the website interface. For IP phone 221, the user can use the a computer connected to the internet to access a predefined website similar to flow 233 to perform the registration of the new device. The user needs to supply the phone number of the original account as well as the password to login to the Registration Server (AS) 215 via internet access. Once the login has been accepted by AS 215, the new MAC address information can be manually entered by the user to be registered.

Once the new MAC address is registered, it can be associated with the original account phone number supplied by the user during login. AS 215 can store the new MAC address to phone number association within the network for later use. In one embodiment, AS 215 may send the MAC address associations update to a CCE and/or another Application Server. The new MAC address will now be associated with all the original subscription information such as the original phone number, the original service features subscribed, and the original billing and provisioning options subscribed. The automatic porting process is then completed.

Figure 3:
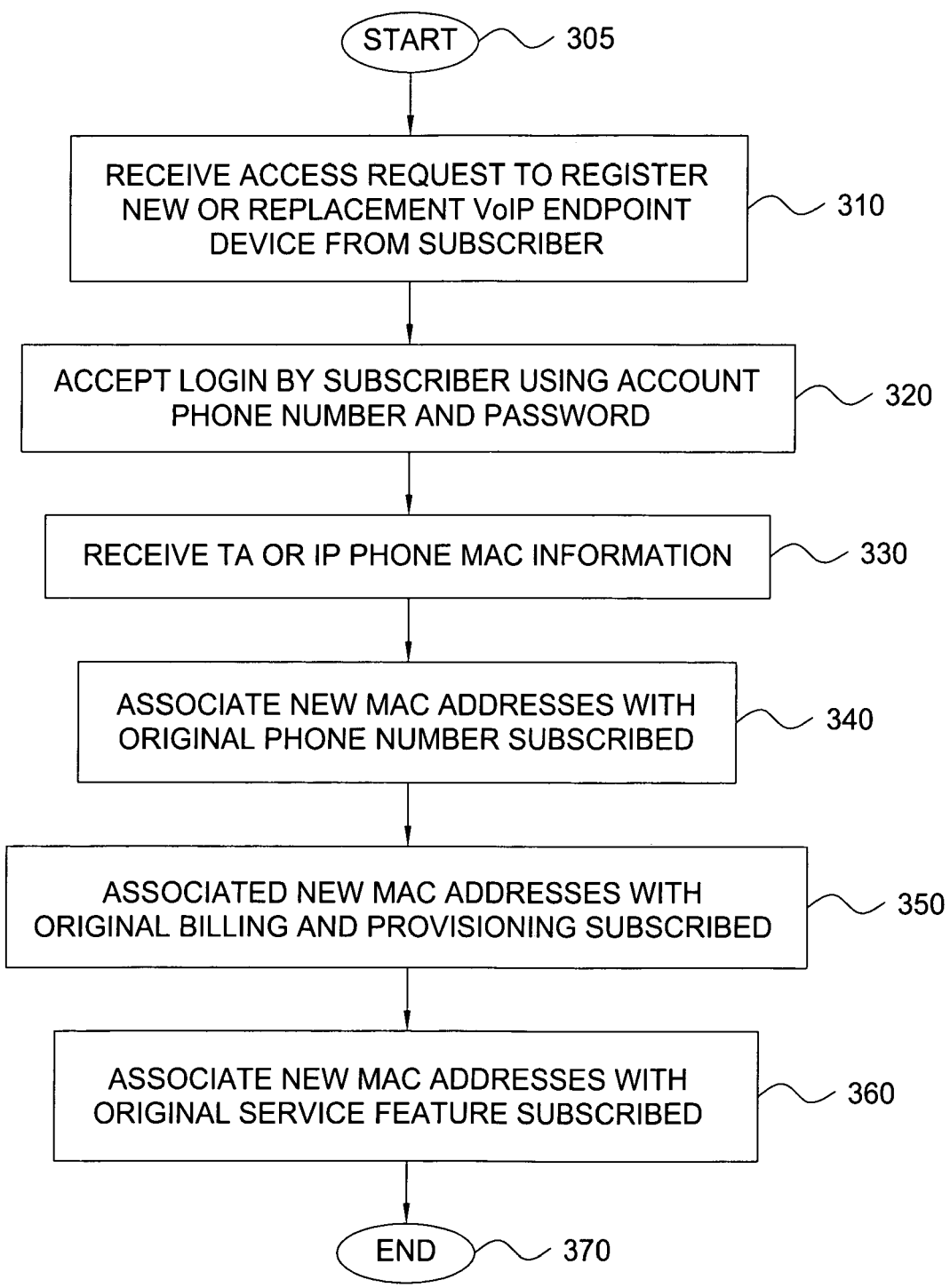
FIG. 3 illustrates a flowchart of a method for automatically porting telephone number of Internet Protocol (IP) endpoint device in a VoIP network of the present invention.

FIG. 3 illustrates a flowchart of a method for automatically porting telephone number of Internet Protocol (IP) endpoint device in a VoIP network. Method 300 starts in step 305 and proceeds to step 310.

In step 310, the method receives an access request to register new or replacement VoIP endpoint device from a subscriber. In step 320, the method accepts the login by the subscriber using the original service account-phone number and password. In step 330, the method receives the MAC address entered by the subscriber manually. In step 340, the method associates the new MAC address with the original service account phone number. In step 350, the method associates the new MAC address with the original billing and provisioning options subscribed. In step 360, the method associates the new MAC address with the original service feature set subscribed. The method ends in step 370.

Figure 4:
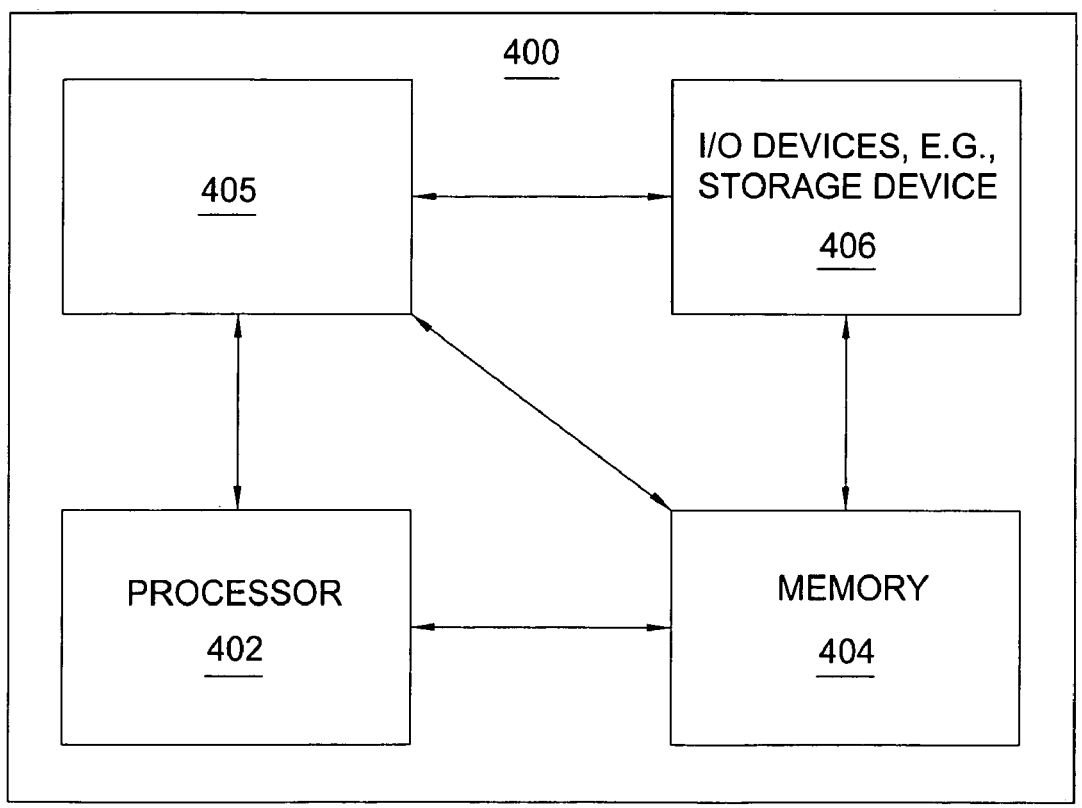
FIG. 4 illustrates a high level block diagram of a general purpose computer suitable for use in performing the functions described herein.

FIG. 4 depicts a high level block diagram of a general purpose computer suitable for use in performing the functions described herein. As depicted in FIG. 4, the system 400 comprises a processor element 402 (e.g., a CPU), a memory 404, e.g., random access memory (RAM) and/or read only memory (ROM), an automatic porting of telephone number of IP device module 405, and various input/output devices 406 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present invention can be implemented in software and/or in a combination of software and hardware, e.g., using application specific integrated circuits (ASIC), a general purpose computer or any other hardware equivalents. In one embodiment, the present automatic porting of telephone number of IP device module or process 405 can be loaded into memory 404 and executed by processor 402 to implement the functions as discussed above. As such, the present automatic porting of telephone number of IP device process 405 (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for porting a telephone number of an internet protocol endpoint device in a communication network, comprising:
   registering a new media access control address for a new internet protocol endpoint device by a subscriber of the network; and
   associating the new media access control address to an existing network service subscribed by the subscriber.

2. The method of claim 1, wherein the communication network is a voice over internet protocol network.

3. The method of claim 1, wherein the media access control address is registered by a registration server via a web-based interface.

4. The method of claim 1, wherein the registering comprises:
   logging into the registration server by the subscriber using an existing phone number and a password of the subscriber.

5. The method of claim 4, wherein the registering further comprises:
   entering the media access control address by the subscriber into the registration server.

6. The method of claim 1, wherein the existing network service comprises an existing phone number.

7. The method of claim 1, further comprising:
   creating a media access control address associations update in response to the associating; and
   sending the media access control address associations update to a call control element.

8. The method of claim 7, wherein the media access control address associations update is sent by a registration server.

9. A computer-readable medium having stored thereon a plurality of instructions, the plurality of instructions including instructions which, when executed by a processor, cause the processor to perform a method for porting a telephone number of an internet protocol endpoint device in a communication network, comprising:
   registering a new media access control address for a new internet protocol endpoint device by a subscriber of the network; and
   associating the new media access control address to an existing network service subscribed by the subscriber.

10. The computer-readable medium of claim 9, wherein the communication network is a voice over internet protocol network.

11. The computer-readable medium of claim 9, wherein the media access control address is registered by a registration server via a web-based interface.

12. The computer-readable medium of claim 9, wherein the registering comprises:
   logging into the registration server by the subscriber using an existing phone number and a password of the subscriber.

13. The computer-readable medium of claim 12, wherein the registering further comprises:
   entering the media access control address by the subscriber into the registration server.

14. The computer-readable medium of claim 9, wherein the existing network service comprises an existing phone number.

15. The computer-readable medium of claim 9, further comprising:
   creating a media access control address associations update in response to the associating; and
   sending the media access control address associations update to a call control element.

16. The computer-readable medium of claim 15, wherein the media access control address associations update is sent by a registration server.

17. A system for porting a telephone number of an internet protocol endpoint device in a communication network, comprising:
   means for registering a new media access control address for a new internet protocol endpoint device by a subscriber of the network; and
   means for associating the new media access control address to an existing network service subscribed by the subscriber.

18. The system of claim 17, wherein the communication network is a voice over internet protocol network.

19. The system of claim 17, wherein the media access control address is registered by a registration server via a web-based interface.

20. The system of claim 17, wherein the existing network service comprises an existing phone number.

\* \* \* \* \*